United States Patent
Parekh et al.

(10) Patent No.: US 7,321,556 B1
(45) Date of Patent: Jan. 22, 2008

(54) APPLICATION PRIORITIZATION POLICY ENGINE

(75) Inventors: Pankaj Parekh, Fremont, CA (US); Sandeep Gupta, Delhi (IN); Vijay Mamtani, New Delhi (IN)

(73) Assignee: iPolicy Networks, Inc, Fremont, CA (US)

( * ) Notice: Subject to any disclaimer, the term of this patent is extended or adjusted under 35 U.S.C. 154(b) by 980 days.

(21) Appl. No.: 10/281,809

(22) Filed: Oct. 28, 2002

(51) Int. Cl.
*H04J 3/14* (2006.01)

(52) U.S. Cl. .................................. 370/232

(58) Field of Classification Search ........ 370/229–235; 709/223, 225, 226
See application file for complete search history.

(56) References Cited

U.S. PATENT DOCUMENTS

| | | | | |
|---|---|---|---|---|
| 6,038,216 A | * | 3/2000 | Packer | 370/231 |
| 6,459,682 B1 | * | 10/2002 | Ellesson et al. | 370/235 |
| 6,910,024 B2 | * | 6/2005 | Krishnamurthy et al. | 705/400 |
| 6,917,979 B1 | * | 7/2005 | Dutra et al. | 709/229 |
| 6,934,745 B2 | * | 8/2005 | Krautkremer | 709/223 |
| 7,113,986 B2 | * | 9/2006 | Goldszmidt et al. | 709/223 |
| 2002/0129157 A1 | * | 9/2002 | Varsano | 709/232 |
| 2003/0086422 A1 | * | 5/2003 | Klinker et al. | 370/389 |

* cited by examiner

*Primary Examiner*—Dmitry Levitan
(74) *Attorney, Agent, or Firm*—William L. Botjer

(57) ABSTRACT

A system and method for enforcing policies on data packets in a computer network is disclosed. The enforcement of policies is done by prioritizing and regulating the flow of data packets. The regulation of prioritized data packets includes a determination of: service level agreement violations, flow control of data packets of a predefined priority and session resettings. For determination of service level agreements the policy engine carries out a response time calculation and finds if it is in consonance with the response time agreed upon in the service level agreement. Flow control in case of a service level agreement violation is implemented either by reducing the server side window size or by delaying acknowledgement packets sent by the client.

12 Claims, 15 Drawing Sheets

| Package | Applications | Number of Connections | Response Time |
|---|---|---|---|
| Package I | Oracle | ORACLE_COUNT | ORACLE_RT |
|  | FTP | FTP_COUNT | FTP_RT |
| Package II | Oracle | 25 | 7 ms |
|  | FTP | 20 | 5 ms |

FIG. 2

| App | User Group | GSC/User Group | App State | Priority |
|---|---|---|---|---|
| FTP | UG I | 20 | ftp get newcode (S1) | H |
| | | | ftp put oldcode (S2) | M |
| | | | ftp <default cmd> (S3) | D |
| | UG II | 10 | S1 | H |
| | | | S2 | L |
| | | | S3 | D |
| | UG III | 10 | S1 | M |
| | | | S2 | D |
| | | | S3 | D |

FIG. 3

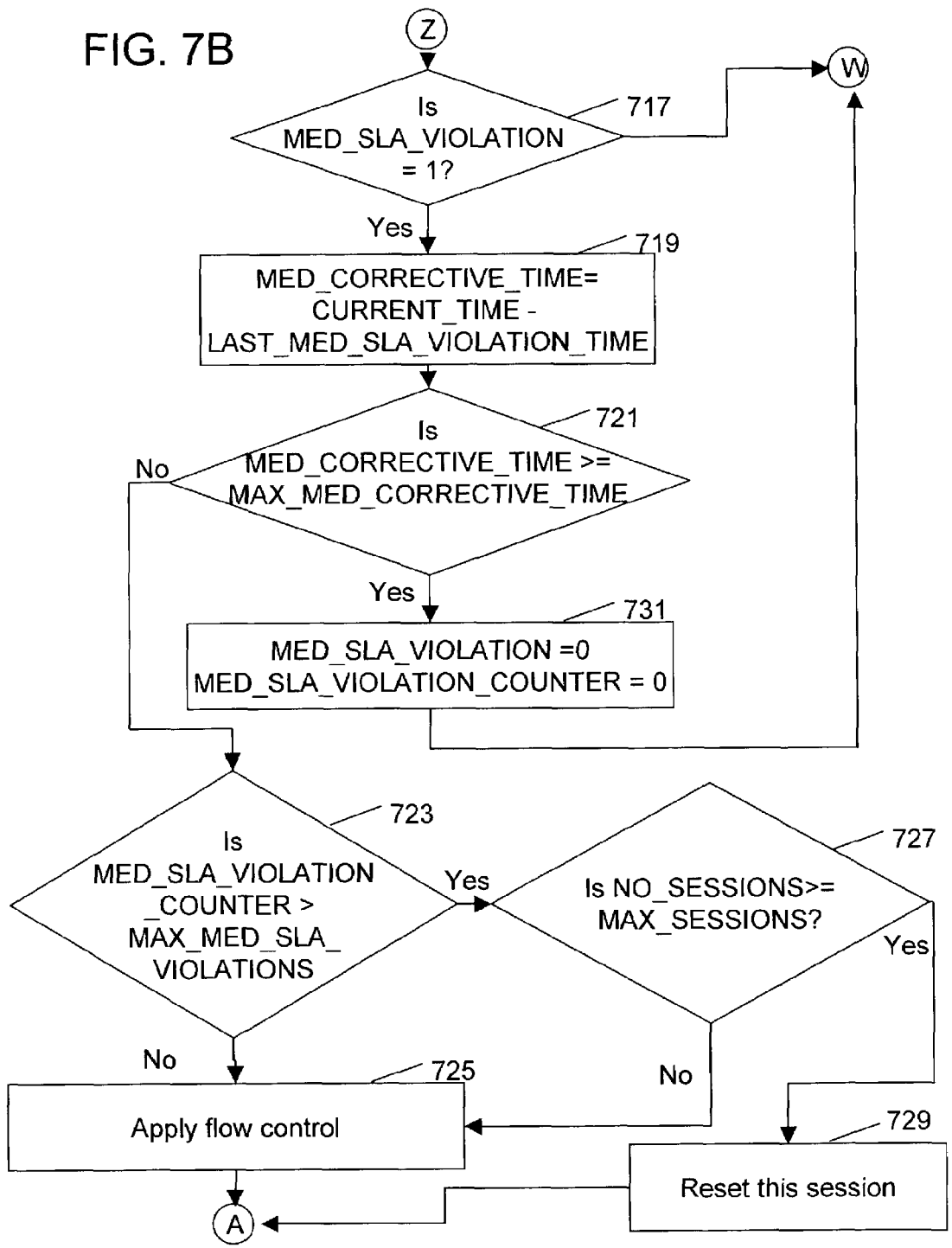

APPLICATION PRIORITIZATION POLICY ENGINE

BACKGROUND

The present invention relates to the field of network communication. More specifically, it relates to policy enforcement on data packets in a computer network.

Increasing deployment of application servers by Application Service Providers (ASPs) has created a strong need for mechanisms through which the ASPs are able to offer guaranteed application performance over the Internet to their customers. However, current network architectures lack tools that can enable ASPs to control the usage of the application server and guarantee response time from their application servers to their customers. This has impacted them adversely in terms of customer confidence in their ability to meet performance requirements. What is therefore needed is a device that can enable the ASPs to offer SLAs (Service Level Agreements) on application performance.

In the past, application bandwidth control devices have been developed for IP networks. Examples are the "Packeteer box" and the "Allot Communications" box. These devices typically sit at the edge of enterprise/ASP network and the Internet and control the bandwidth of the link that is available to application traffic from defined source/destination etc. However, none are known to be able to control the number of simultaneous transactions of the application and the response time of application. Also they are limited in their capability to look deep into the IP packets in terms of transactions and associated parameters of applications and differentiate the priority accorded on this basis. Their scaling capabilities are also limited in terms of the speed of the link, the number of policies they can enforce and the number of simultaneous connections/sessions they can handle.

SUMMARY

The present invention is a system, method and computer program product for enforcing policies on data packets in a computer network. In accordance with one aspect, the present invention provides a system and method, which takes data packets as input and facilitates their prioritization. This prioritization is based on a Service Level Agreement (SLA) between an Application Service Provider and a customer.

In accordance with another aspect, the present invention provides a system and method for regulating the flow of the data packets of the prioritized data packets. These data packets are checked for SLA violations. If an SLA violation has occurred for data packets then flow control is implemented in accordance with the predefined priorities of the data packets. The system and method can also reset the current session if the service level agreement violations and number of ongoing sessions exceed their respective predefined maximum limits.

In accordance with another aspect, the present invention provides a system and a method for determining the response time of the data packets. The value of the response time is used to determine whether an SLA violation has taken place. This is done by comparing determined response time with the response time agreed upon in service level agreement for data packets.

In accordance with another aspect, the present invention provides a system and method for flow control of data packets by reduction of window size and by delaying acknowledgment (ACK) packets for lower priority packets.

BRIEF DESCRIPTION OF THE DRAWINGS

The preferred embodiments of the invention will hereinafter be described in conjunction with the appended drawings provided to illustrate and not to limit the invention, wherein like designations denote like elements, and in which:

FIG. 2 illustrates a sample Service Level Agreement (SLA) that an Application Service Provider (ASP) offers to a customer;

FIG. 3 illustrates a method to assign priorities to data packets;

FIGS. 7A, 7B and 7C illustrate a method of flow regulation for Default priority packets;

DESCRIPTION OF PREFERRED EMBODIMENTS

Figure 1:
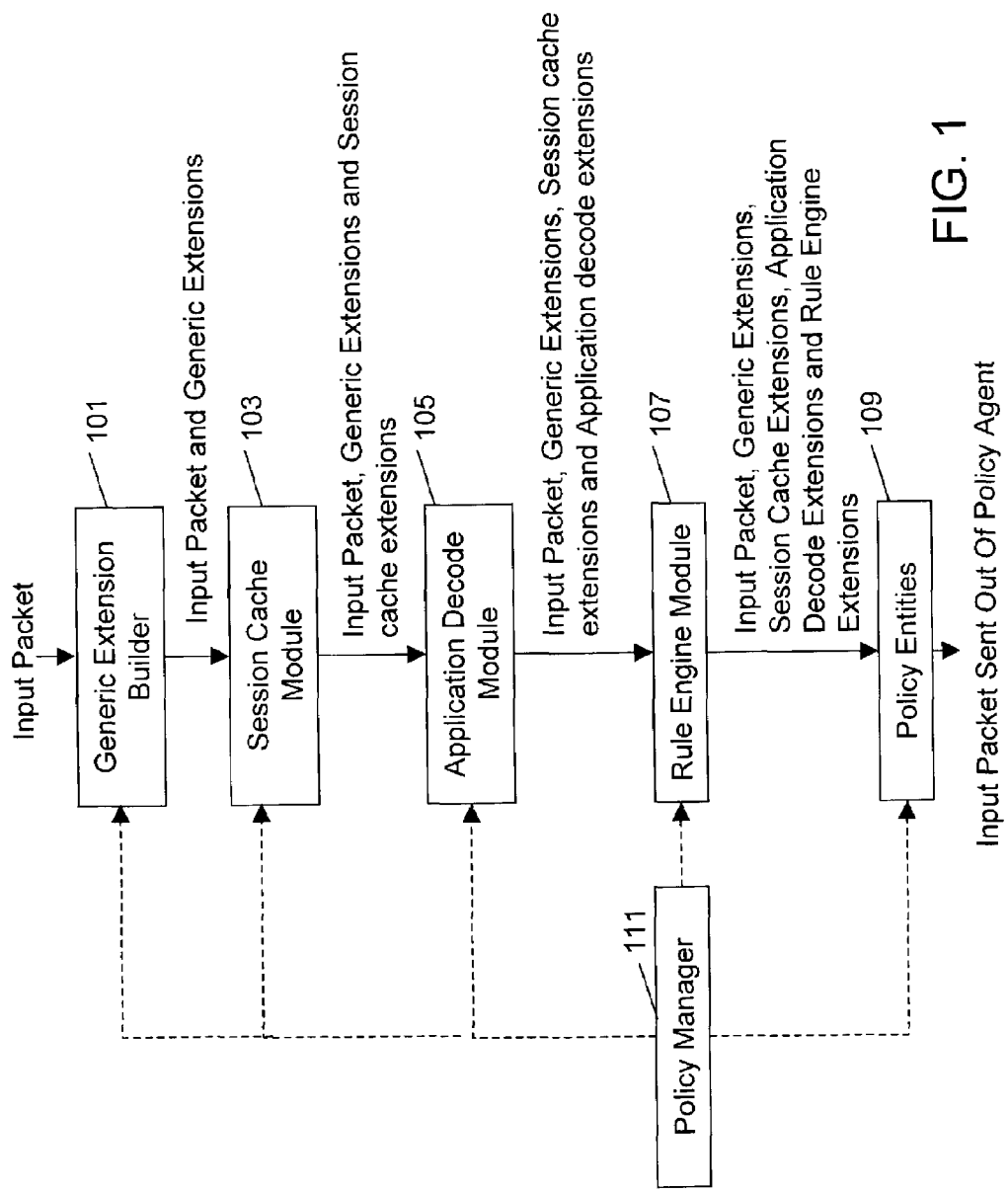
FIG. 1 is a schematic diagram that illustrates the functional modules of an exemplary Policy Agent.

Definitions:

START_TIME: It is a variable that stores the timestamp when a data session starts between a client and a server.

CURRENT_TIME: It denotes the current time.

CLIENT_ACK_TIME: It is the time when the client ACK is received by the server.

HI_SLA_VIOLATION_COUNTER: It is a counter that is incremented when there is an SLA violation for high priority data packets. The counter is decremented when there is no SLA violation for the high priority data packets.

HI_SLA_VIOLATION: It is flag that is set to 1 when there is an SLA violation of the high priority data packets. It is set to zero when there is no SLA violation for the high priority data packets.

LAST_HI_SLA_VIOLATION_TIME: It denotes the time when the last SLA violation for the high priority data packets occurred.

MED_SLA_VIOLATION_COUNTER: It is a counter that is incremented when there is an SLA violation for the medium priority data packets. The counter is decremented when there is no SLA violation for the medium priority data packets.

MED_SLA_VIOLATION: It is flag that is set to 1 when there is an SLA violation of the medium priority data packets. It is set to zero when there is no SLA violation for the medium priority data packets.

LAST_MED_SLA_VIOLATION_TIME: It denotes the time when the last SLA violation for the medium priority data packets occurred.

HI_CORRECTIVE_TIME: It is the time elapsed since the last HI_SLA_VIOLATION was encountered in a high priority data packet.

MAX_HI_CORRECTIVE_TIME: It is a maximum predefined value.

MAX_HI_SLA_VIOLATIONS: It is a maximum predefined value.

NO_OF_SESSIONS: It denotes the number of simultaneous client sessions being made with the server.

MAX_SESSIONS: It is a maximum predefined value.

MED_CORRECTIVE_TIME: It is the time elapsed since the last MED_SLA_VIOLATION was encountered in a medium priority data packet.

MAX_MED_CORRECTIVE_TIME: It is a maximum predefined value.

MAX_MED_SLA_VIOLATIONS: It is a maximum predefined value.

LOW_SLA_VIOLATION_COUNTER: It is a counter that is incremented when there is an SLA violation for the low priority data packets. The counter is decremented when there is no SLA violation for the low priority data packets.

LOW_SLA_VIOLATION: It is flag that is set to 1 when there is an SLA violation of the low priority data packets. It is set to zero when there is no SLA violation for the low priority data packets.

LAST_LOW_SLA_VIOLATION_TIME: It denotes the time when the last SLA violation for the low priority data packets occurred.

LOW_CORRECTIVE_TIME: It is the time elapsed since the last LOW_SLA_VIOLATION was encountered in a low priority data packet.

MAX_LOW_CORRECTIVE_TIME: It is a maximum predefined value.

MAX_LOW_SLA_VIOLATIONS: It is a maximum predefined value.

CURRENT_SENDER_WS: It denotes the current window size of the sender.

NEW_SENDER_WS: It denotes the new window size of the sender.

WS_REDUCTION_FACTOR: It denotes the window size reduction factor.

SESSION_MSS: It denotes the maximum segment size of the session.

ACK_ARRAY: It denotes an array that stores the ACK packets.

The present invention is envisaged to be operating within an integrated policy enforcement system hereinafter referred to as a Policy Agent (PA). The Policy Agent may be embodied in a product such as the ipEnforcer 5000® as provided by iPolicy Networks Inc. of Fremont, Calif. This product is used to enforce management policies on networks, and is placed at a point where data packets enter a network. Further, the Policy Agent may be encoded in a programming language such as C or Assembly. It would be evident to one skilled in the art that various other programming languages can be used to encode the Policy Agent.

The Policy Agent scans the data packets as they pass through it, and enforces policies on these data packets. Although the Policy Agent may be variously provided, a description of one such Policy Agent can be found in U.S. patent application Ser. No. 10/052,745 filed on Jan. 17, 2002, and titled "Architecture for an Integrated Policy Enforcement System", the entire contents of which are hereby incorporated by reference. However, it may be noted that the present invention may be adapted to operate in other Policy Agents by one skilled in the art.

Application Service Providers (ASPs) implement Service Level Agreements (SLAs) while providing service to their customers. This implementation is achieved using the PA. FIG. 1 is a schematic diagram that illustrates the functional modules of an exemplary PA. The PA intercepts the data packets of interest traveling in the network. The data packets of interest include the data packets on which the PA has to enforce SLA policies. In a preferred embodiment of the present invention, these packets are TCP/UDP data packets. It would be evident to one skilled in the art that SLA policies can be enforced on other type of data packets. The PA contains several modules. These modules include Generic Extension Builder 101, Session Cache Module 103, Application Decode Module 105, Rule Engine Module 107 and Policy Entities 109.

Generic Extension Builder 101 processes the data packet headers for information related to Open Systems Intersession (OSI) Layer 2 and Layer 3.

Session Cache Module 103 processes the data packet headers for information related to OSI Layer 4 and layers above it.

Application Decode Module 105 identifies the application generating the data packet and tracks the data packet as it transitions from one application state to another.

Rule Engine Module 107 makes policy decisions based on the information gathered from the previous modules. It identifies rules matched by a data packet, and passes this information to Policy Entities 109.

Policy Entities 109 comprises policy-processing modules, which are also referred to as Service Application Modules (SAMs). These modules analyze the data packet further according to its requirements and enforce policies. SAMs include, but are not limited to, Firewall modules, Intrusion Detection System (IDS) modules and Virtual Private Network (VPN) modules.

All sub modules of PA operate at real time processing rates in order to be able to operate in a real network environment. A data packet received by the PA is passed through these modules one by one as shown in the FIG. 1. The function of the modules within the PA is to gather characteristics specific to a data packet and pass them on to subsequent modules using data packet extensions. Finally the data packet with all extensions appended to it, reaches the Policy Entities 109. An Application Prioritization Policy Engine (AP PE) is a part of Policy Entities 109. The prioritization and regulation of data packets is done by the AP PE.

Policy Manager 111 comprises policy rules, which are implemented by the PA. Policy Manager 111 loads the policy rules to the PA. Policy Manager 111 is responsible for configuring the policies or rules to be enforced by the PA in policy engines.

The data packet extensions attached to the data packet by the different sub modules of the PA are stripped off before the data packets are released back into the network.

FIG. 2 illustrates a sample Service Level Agreement (SLA) that an Application Service Provider (ASP) offers to a customer. The ASP in this sample SLA offers control of two parameters, i.e., Response Time of the server and Number of Sessions at the server. The figure shows two kinds of packages, these are Package I and Package II. These two packages have different SLA values for Response Time and Number of Sessions that have been guaranteed by the ASP. Till the actual Response Time and Number of Session values are less than the values as shown in the FIG. 2, no SLA violation would occur for the data packets. If the actual values exceed the values given in the FIG. 2, an SLA violation may occur. The violation then triggers flow control of data packets.

In accordance with the SLA parameters defined for the data packets, prioritization of the data packets is done by the AP PE. The data packets are prioritized as High, Medium, Low or Default by the AP PE. On the basis of this prioritization, the flow of the data packets is regulated. The classification of the data packets as High, Medium, Low and Default is defined by the SLA. FIG. 3 illustrates a method to assign priorities to the data packets. For Example, FIG. 3 illustrates that an FTP "to get newcode" file accessed by a user in user group I (UGI) is identified as High priority traffic. On the other hand, FTP "to put oldcode" file accessed by a user in user group I is identified as Medium priority traffic. Similarly other policies define the priority of the data traffic for other user groups (UGI II and UGI III) with different priorities.

The Response Time given by the ASP in FIG. 2 for FTP (for Package I) is used to derive Response Times for High, Medium, Low and Default traffic using any heuristic algorithm. For example, an ASP is hosting an FTP server for the customer and the customer has bought Package II from the ASP. According to the SLA, the customer can carry out 25 sessions with the FTP server and with those 25 Sessions, response time of the server will be 7 ms. If the Number of Sessions exceed 25, the 7 ms response time translates to 7 ms response time for High priority FTP traffic, 8 ms for Medium priority traffic, 10 ms for Low priority traffic and 15 ms for Default priority traffic. The heuristic algorithm takes one parameter (Response Time, 7 ms, in this case) and translates it to 4 values for 4 different priorities. Further, if there are 10 simultaneous sessions, then all sessions will get a Response Time of 7 ms. When the Number of current Sessions exceed 25, the flow control of medium, low and default priority packets starts. As a result, High priority traffic gets a Response Time of 7 ms, Medium priority traffic 8 ms and so on. When the Number of Sessions exceed beyond a predefined maximum limit, some of the new sessions may not be allowed (or are Reset) to maintain the SLA Response Time for the existing traffic.

Figure 4:
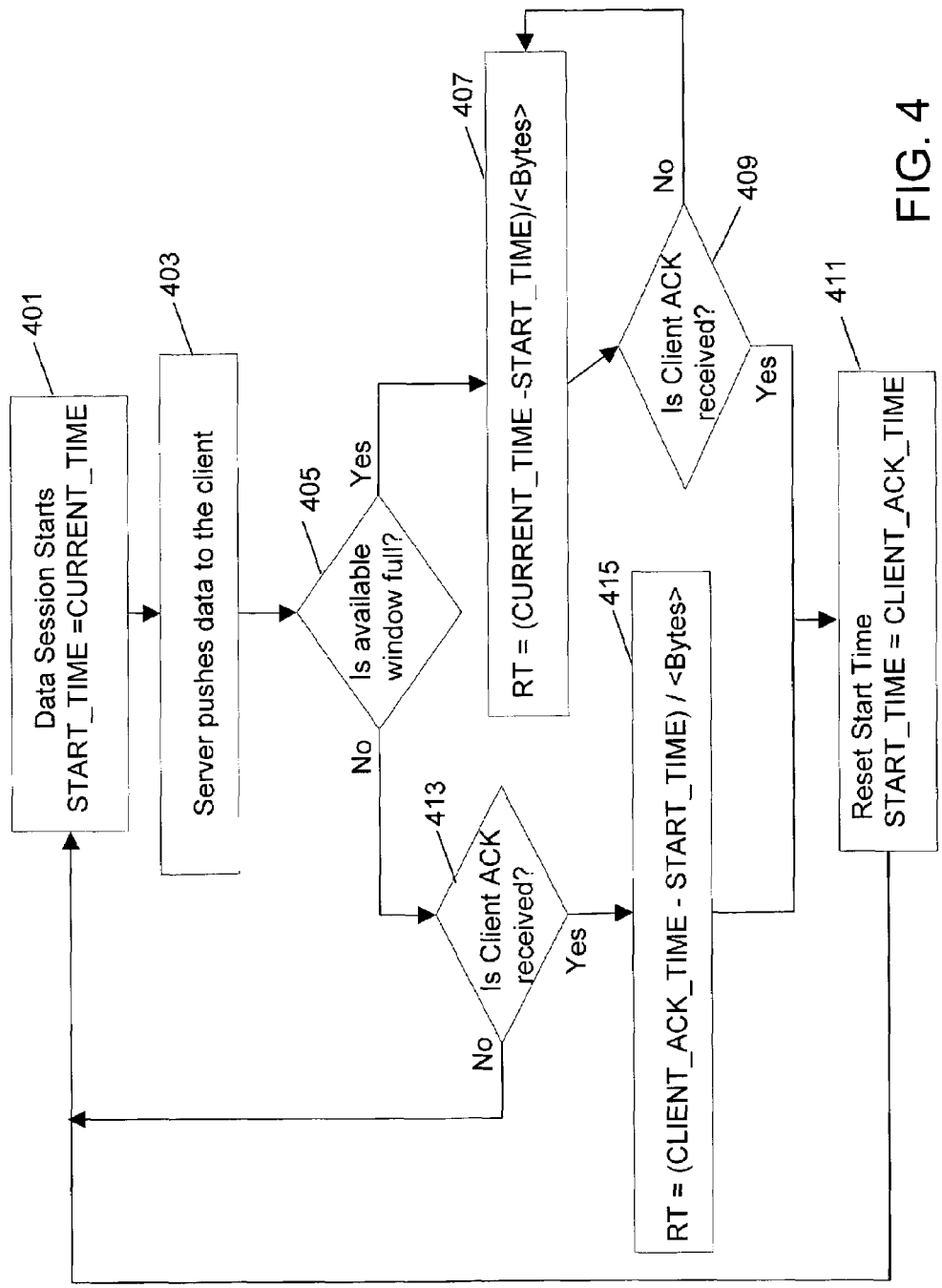
FIG. 4 illustrates a method of determining response time.

FIG. 4 illustrates a method of determining the Response Time. When the server receives a request for data from a client, a data session starts between the client and the server, as shown in step 401. At step 403, the server starts pushing data to the client. The data that is pushed by the server depends upon a window size advertisement made by the client. The client along with an ACK sends a current data accepting capacity at its side in terms of bytes. This advertisement of its current data accepting capacity is known as the window size advertisement. The server sends data to the client till the window size advertised by the client is full and the client has not acknowledged receipt of the data. Every time the server pushes data to the client a check is made whether the client side window is full or not, as shown in step 405. If the client window is full, then it implies that the client side window is not large enough to accept all the data sent by the server. This shows that the server is capable of sending data in accordance with the window size advertised by the client but the client is not capable of accepting data from the server. Thus, before the client ACK is received the Response Time for the server is calculated, as shown in step 407. Client ACK is an acknowledgement by the client for the data it has received from the server. At step 409, a check is made whether the client ACK is received. After the client ACK is received, the START_TIME is assigned the time when the client ACK is received, as shown in step 411. After the server sends data to the client, as shown in step 403, it is possible that the client side window is not full, as shown in step 405. This implies that it is the server, which is slow in sending the data. The client, however, is ready to accept more data. In this case, the client ACK is waited for, as shown in step 413. After the client ACK is received, the Response Time calculation is done at step 415. The START_TIME is again initialized to the time stamp when the last client ACK was received, as shown in step 411. It would be evident to one skilled in the art that various other methods can be used to determine the Response Time.

The Response Time calculated is used by the AP PE to determine whether the SLA for a data packet is being violated or not. Depending on the priority of the data packet received by the PA, different actions are taken to regulate flow of data.

Figure 5A:
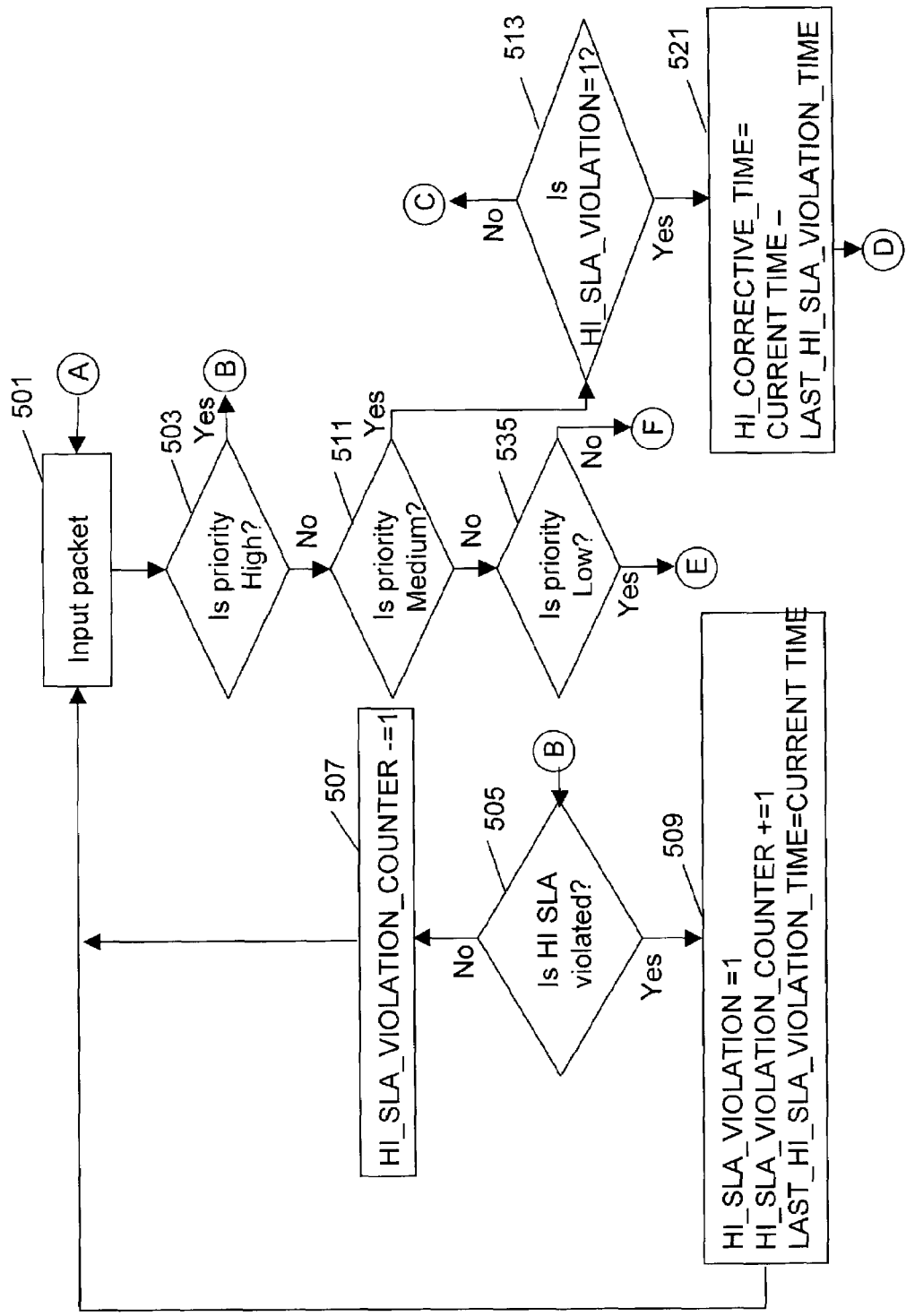
FIGS. 5A and 5B illustrate a method of flow regulation for High and Medium priority packets.
Figure 5B:
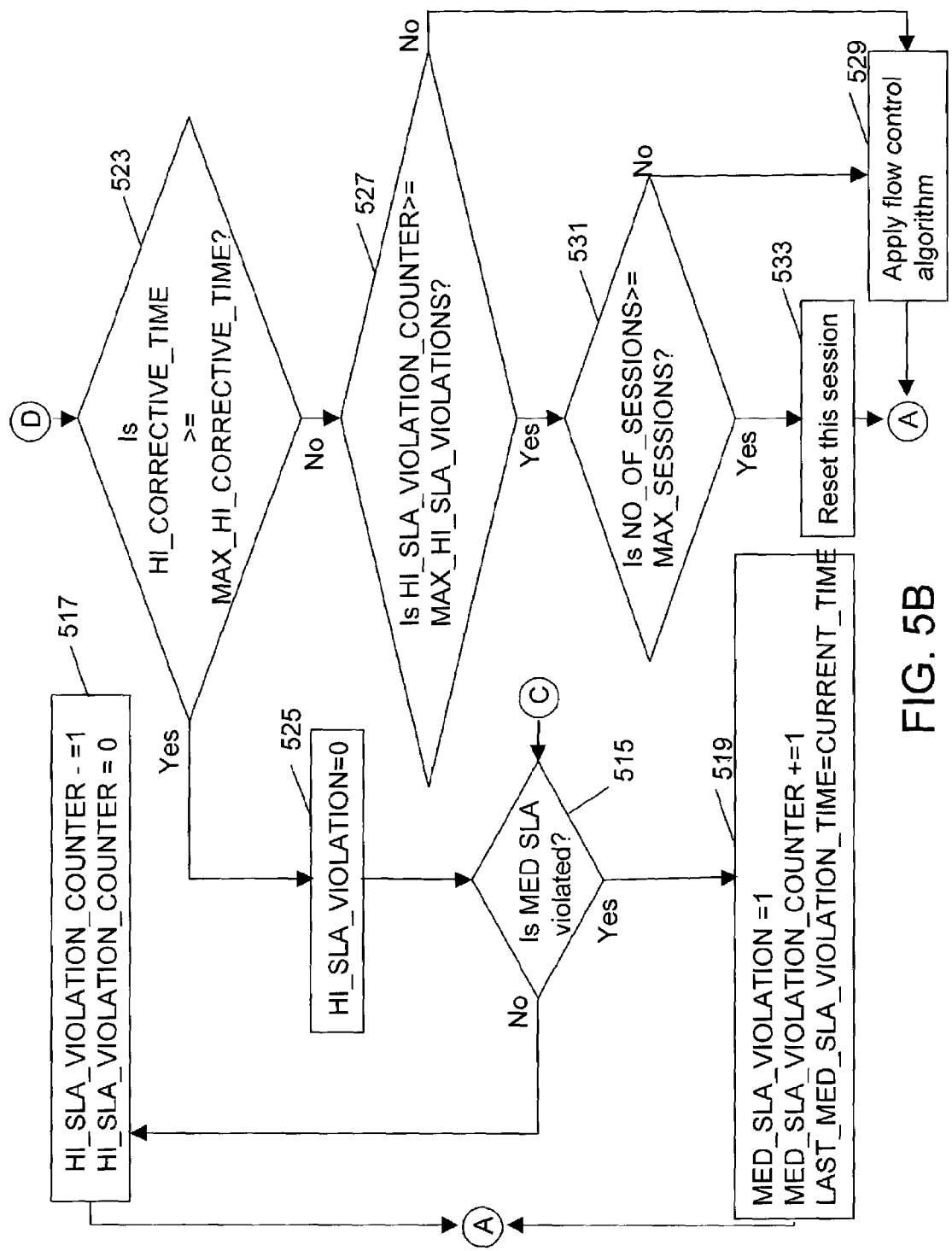

FIG. 5 illustrates a method of flow regulation for High and Medium priority packets. The method used is "packet based" as the course of action followed depends on the nature of data packet that is under consideration. The method takes into account two server parameters for the purpose of flow regulation of data. These two parameters are the Response Time and the Number of Sessions. In case a violation of the SLA is encountered, flow control is applied. The actual flow control actions may get triggered before the SLA violation has actually occurred. For example, if according to the SLA the Response Time is 7 ms, flow control can start when the Response Time comes near to 6 ms. Flow control is applied on medium, low and default priority packets.

In FIG. 5, at step 501, a new input data packet is received by the AP PE. The data packet is checked for its priority, as shown in steps 503, 511 and 535. At step 503, if it is determined that the input data packet has High priority, a check is made to determine whether this High priority data packet is SLA violated, as shown in step 505. If the data packet has not been SLA violated, then a HI_SLA_VIOLATION_COUNTER is decremented by 1, as shown in step 507. However, in case the High priority data packet has been SLA violated, the flag HI_SLA_VIOLATION is set to 1, HI_SLA_VIOLATION_COUNTER is incremented by 1 and the CURRENT_TIME stamp is recorded in LAST_HI_SLA_VIOLATION_TIME, as shown in step 509.

If the data packet is not a High priority data packet then, as shown in step 511, it is determined whether the data packet has Medium priority. In case the data packet has Medium priority, it is checked whether the HI_SLA_VIOLATION flag is set to 1, as shown in step 513. If the flag is not set to 1, then no flow control of the data packet is needed and a check is made at step 515 for the SLA violation of Medium priority data packets. If the violation has not taken place then the MED_SLA_VIOLATION_COUNTER is decremented at step 517. However, if the SLA violation of Medium priority data packets has taken place, the flag MED_SLA_VIOLATION is set to 1, MED_SLA_VIOLATION_COUNTER is incremented by 1 and the LAST_MED_SLA_VIOLATION_TIME is assigned the value of CURRENT_TIME stamp, as shown in step 519. New input data packets are received at step 501. At step 513, if the HI_SLA_VIOLATION flag is 1, then HI_CORRECTIVE_TIME is found at step 521. HI_CORRECTIVE_TIME is calculated by deducting LAST_HI_SLA_VIOLATION_TIME from the CURRENT_TIME. Subsequently, a check is made to determine whether this HI_CORRECTIVE_TIME is greater than a predefined MAX_HI_CORRECTIVE_TIME as shown in step 523. MAX_HI_CORRECTIVE_TIME is a predefined parameter. If HI_CORRECTIVE_TIME is greater than the MAX_HI_CORRECTIVE_TIME then it is assumed that SLA violation for High priority data packets has already been corrected and no flow control is needed. The HI_SLA_VIOLATION flag and HI_SLA_VIOLATION_COUNTER are also set to 0 to reflect the current state of SLA violations, as shown in step 525. Subsequently, a check for Medium priority data packet's SLA violation is made at step 515. If the HI_CORRECTIVE_TIME is less than the MAX_HI_CORRECTIVE_TIME, then a check is made to determine whether the HI_SLA_VIOLATION_COUNTER is greater than MAX_HI_SLA_VIOLATIONS, as shown in step 527. If the HI_SLA_VIOLATION_COUNTER value is less than the MAX_HI_SLA_VIOLATIONS, then flow control is applied, as shown in step 529. If the HI_SLA_VIOLATION_COUNTER grows to a value greater than MAX_HI_SLA_VIOLATIONS, then at step 531 a check is made whether the NO_OF_SESSIONS on the server exceed the MAX_SESSIONS. In case the NO_OF_SESSIONS on the server exceeds the MAX_SESSIONS, the current session is Reset, as shown in step 533. If the NO_OF_SESSIONS on the server is less than the MAX_SESSIONS, flow control is applied at step 529. New input data packets are received at step 501.

Figure 6A:
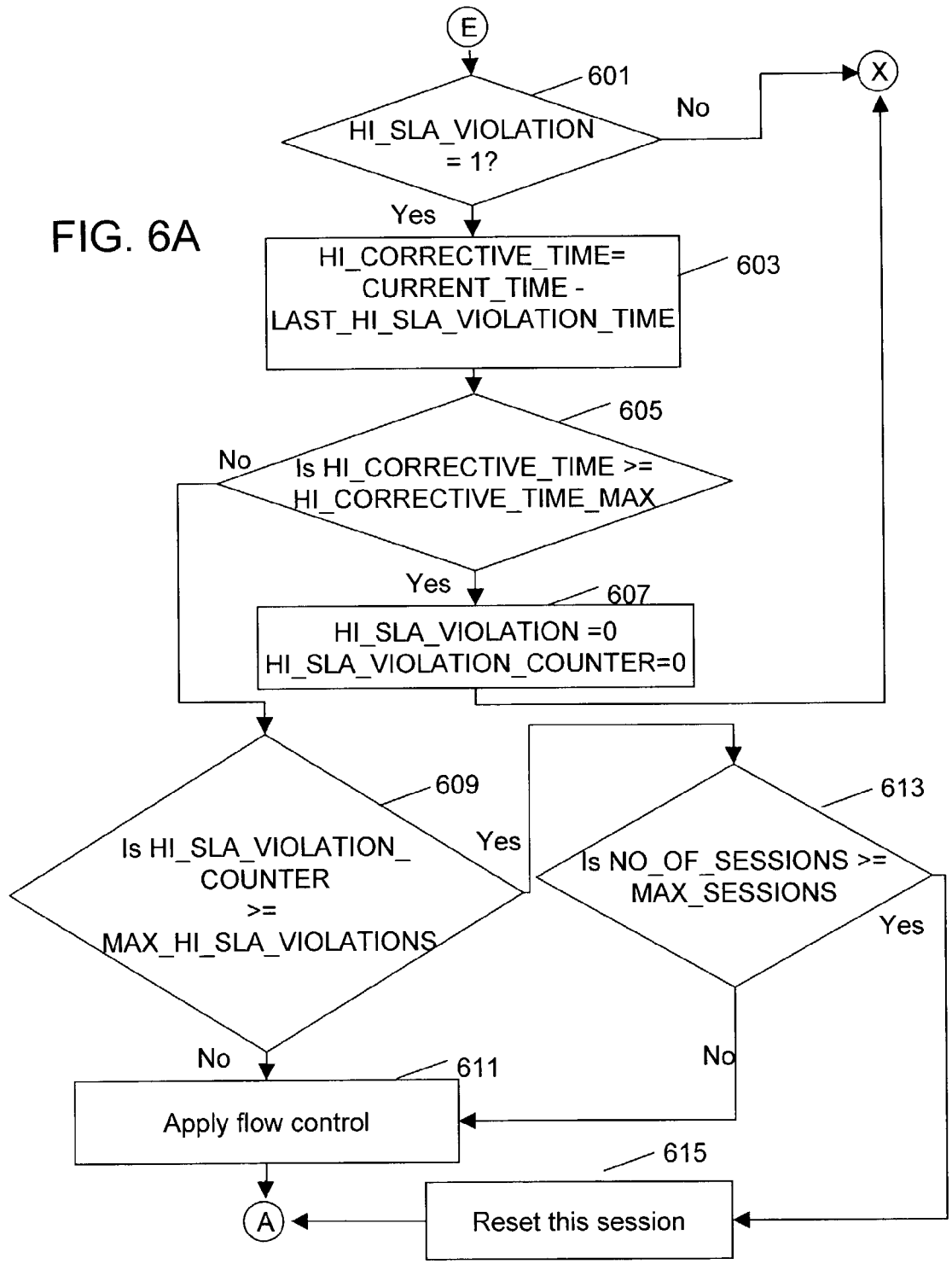
FIGS. 6A, 6B and 6C illustrate a method of flow regulation for Low priority packets.
Figure 6B:
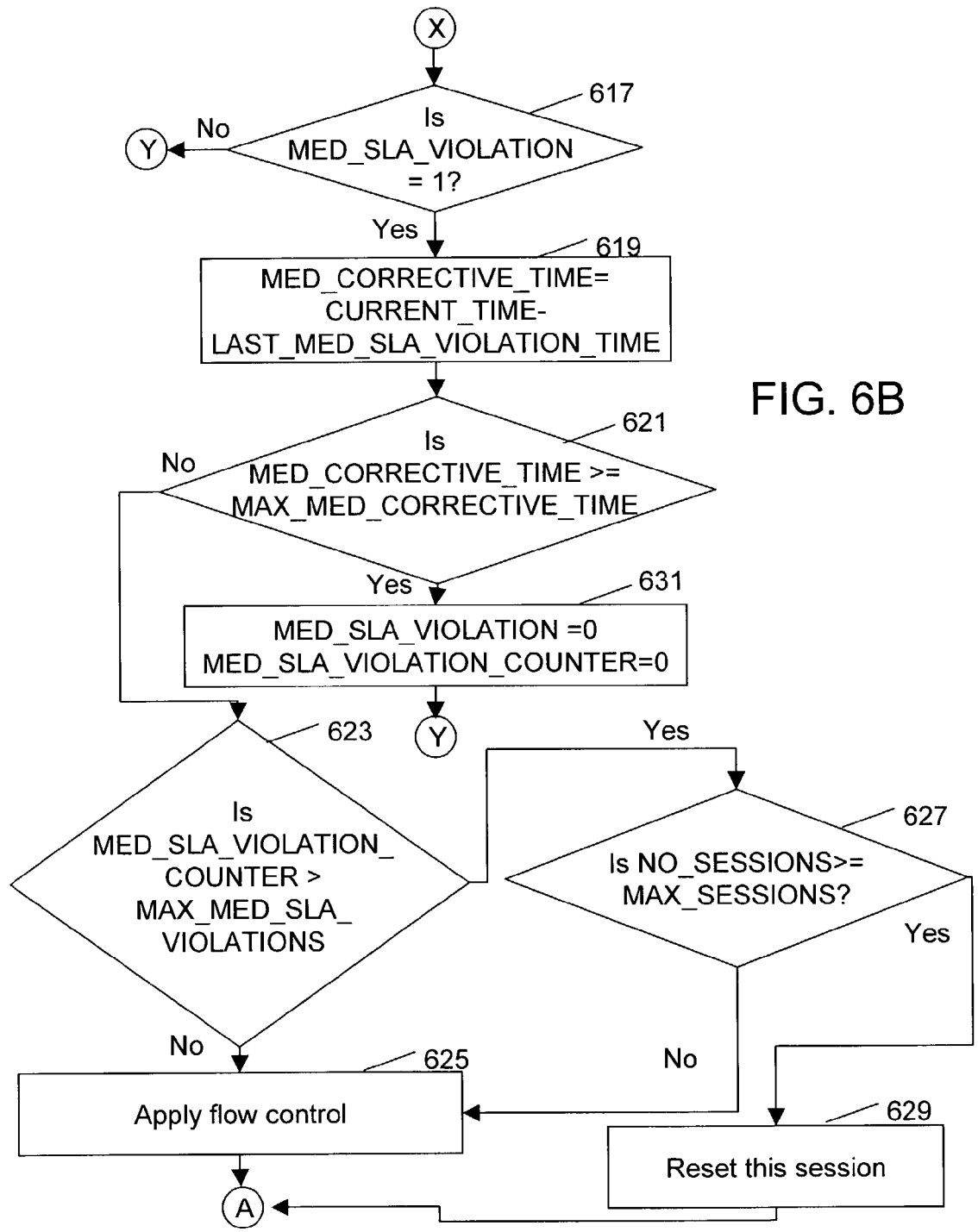
Figure 6C:
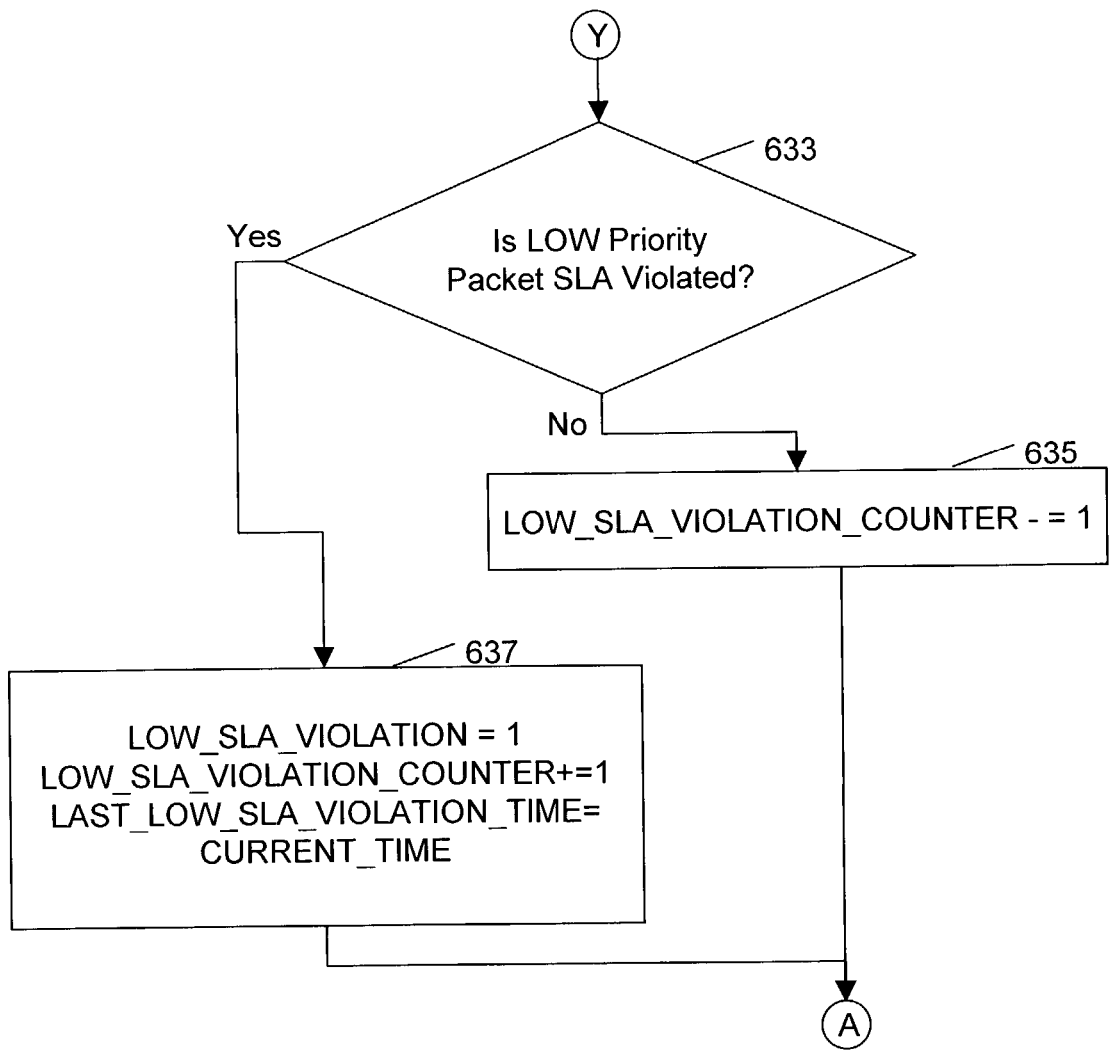

FIG. 6 illustrates a method of flow regulation for Low priority packets. If at step 535, the data packet priority is found to be Low, then a check is made at step 601 to determine whether the HI_SLA_VIOLATION flag is set to 1. If the HI_SLA_VIOLATION flag is set to 1, the HI_CORRECTIVE_TIME is found, as shown in step 603. A check is then made to determine whether the HI_CORRECTIVE_TIME is greater than the MAX_HI_CORRECTIVE_TIME, as shown in step 605. If the HI_CORRECTIVE_TIME is greater than the MAX_HI_CORRECTIVE_TIME, then it is assumed that the SLA violation for High priority data packets has already been corrected and no flow control is needed. The HI_SLA_VIOLATION flag and the HI_SLA_VIOLATION_COUNTER are then set to 0, as shown in step 607. Subsequently, the SLA violation status of medium priority data packets is checked. At step 605, if the HI_CORRECTIVE_TIME is less than the MAX_HI_CORRECTIVE_TIME, then a check is made to determine whether the HI_SLA_VIOLATION_COUNTER is greater than the MAX_HI_SLA_VIOLATIONS, as shown in step 609. If the HI_SLA_VIOLATION_COUNTER is less than the MAX_HI_SLA_VIOLATIONS, then flow control is directly applied at step 611. If the HI_SLA_VIOLATION_COUNTER is greater than the MAX_HI_SLA_VIOLATIONS, then a check is made to determine whether the NO_OF_SESSIONS currently underway is greater than the MAX_SESSIONS, as shown in step 613. In case the NO_OF_SESSIONS is greater than the MAX_SESSIONS, then the current session is Reset at step 615, else flow control is applied at step 611. New input data packets are then received at step 501.

After the check for HI_SLA_VIOLATION is completed or if no HI_SLA_VIOLATION had taken place, a check for MED_SLA_VIOLATION is made at step 617. If the MED_SLA_VIOLATION flag is set to 0, then a check is made for violations of Low priority data packets. But if the MED_SLA_VIOLATION flag is found to have a value equal to 1, then a MED_CORRECTIVE_TIME is calculated, as shown in step 619. This value is found by deducting LAST_MED_SLA_VIOLATION_TIME from the CURRENT_TIME stamp. A check is then made to determine whether the MED_CORRECTIVE_TIME is greater than the MAX_MED_CORRECTIVE_TIME, as shown in step 621. If the MED_CORRECTIVE_TIME is less than the MAX_MED_CORRECTIVE_TIME, then a check is made whether the MED_SLA_VIOLATION_COUNTER is greater than MAX_MED_SLA_VIOLATIONS, as shown in step 623. If the MED_SLA_VIOLATION_COUNTER is not greater than the MAX_MED_SLA_VIOLATIONS, then flow control is applied at step 625. However, if the MED_SLA_VIOLATION_COUNTER is greater, then a check is made to determine whether the NO_OF_SESSIONS currently underway is greater than MAX_SESSIONS, as shown in step 627. If the NO_OF_SESSIONS is greater, then current session is Reset at step 629, else flow control is applied at step 625. New input data packets are then received at step 501. If the MED_CORRECTIVE_TIME is greater than MAX_MED_CORRECTIVE_TIME at step 621, then it is assumed that the violation of Medium priority data packets has already been corrected. Subsequently, the MED_SLA_VIOLATION flag and MED_SLA_VIOLATION_COUNTER are set to 0, as shown in step 631.

After the check for MED_SLA_VIOLATION is completed, a check for SLA violation of Low priority data packet is made at step 633. If there is no SLA violation of Low priority data packet, then the LOW_SLA_VIOLATION_COUNTER is decremented, as shown in step 635. New input data packets are then received at step 501. However, if SLA violation has taken place for Low priority data packet, then the LOW_SLA_VIOLATION flag is set to 1, the LOW_SLA_VIOLATION_COUNTER is incremented and the LAST_LOW_SLA_VIOLATION_TIME is set to the CURRENT_TIME stamp, as shown in step 637. New input data packets are then received at step 501.

Figure 7A:
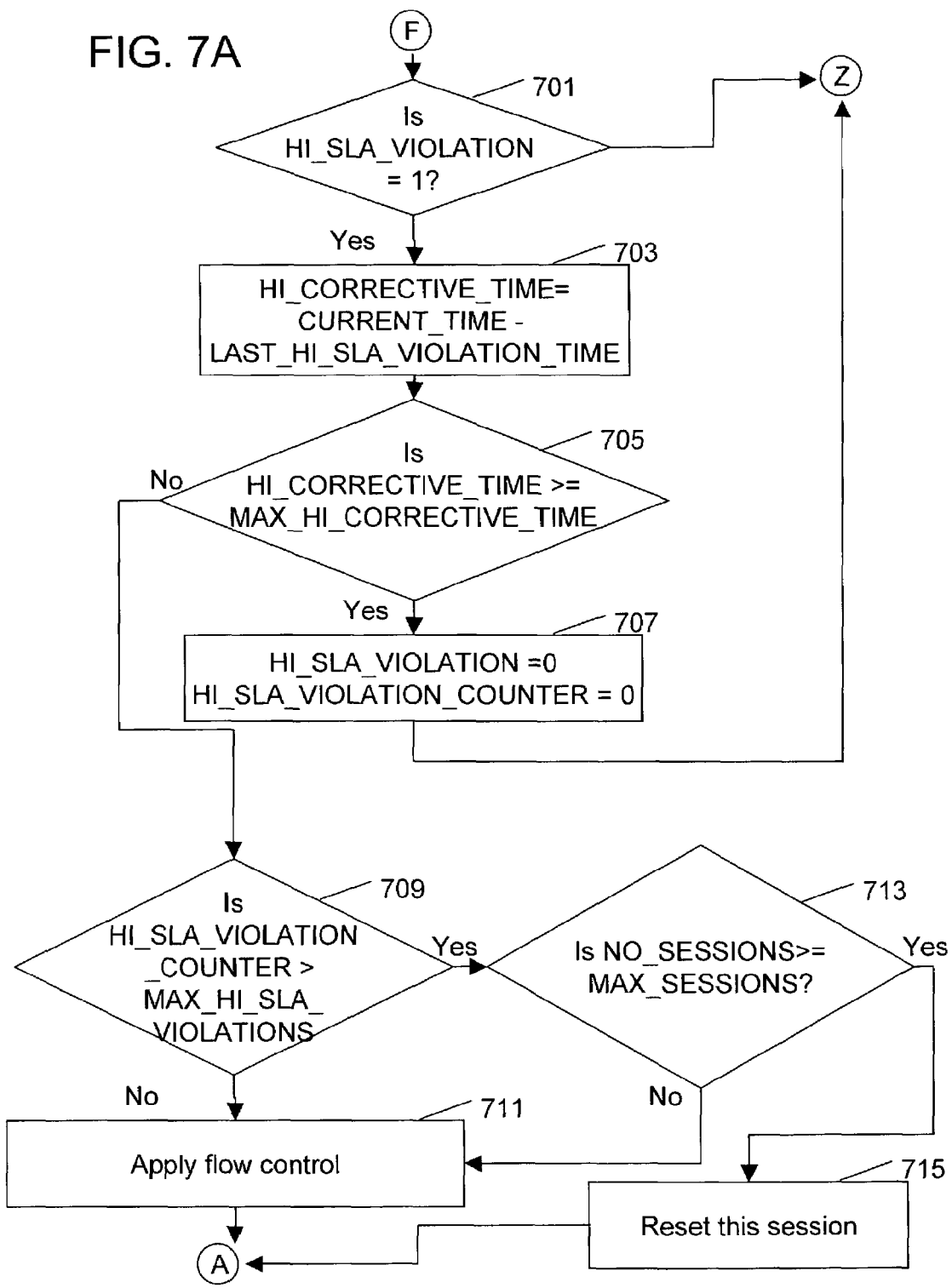
Figure 7C:
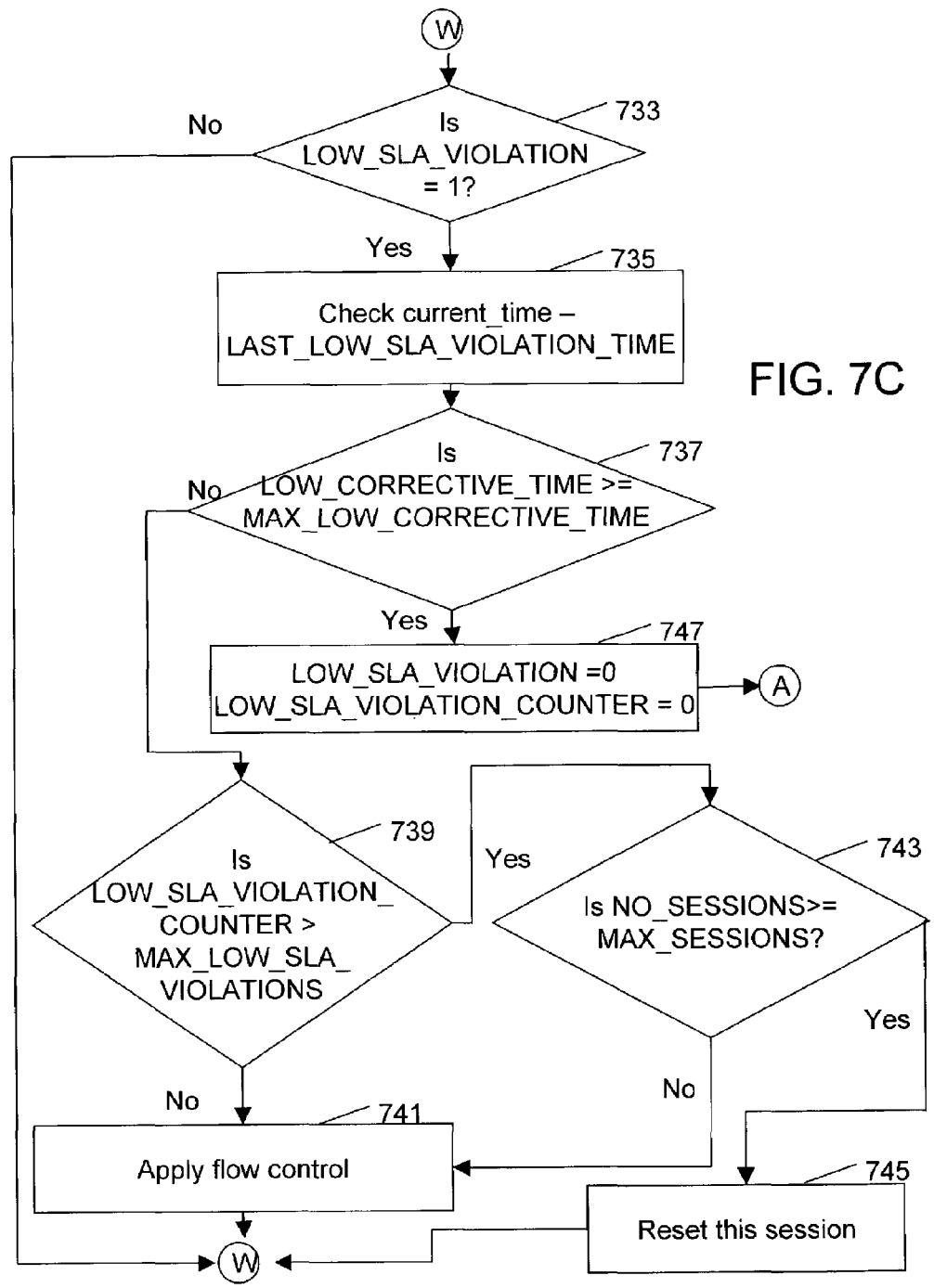

If at step 535 the data packet priority is not found to be Low, then the data packet has a Default priority. FIG. 7 illustrates a method of flow regulation for Default priority packets. A check is made at step 701 to determine whether HI_SLA_VIOLATION flag is 1. If the HI_SLA_VIOLATION flag is set to 1, the HI_CORRECTIVE_TIME is determined, as shown in step 703. A check is then made to determine whether this HI_CORRECTIVE_TIME is greater than the MAX_HI_CORRECTIVE_TIME at step 705. If the HI_CORRECTIVE_TIME is greater than the MAX_HI_CORRECTIVE_TIME, then it is assumed that SLA violation for High priority data packets has already been corrected and no flow control is needed. The HI_SLA_VIOLATION flag and HI_SLA_VIOLATION_COUNTER are then set to 0, as shown in step 707. A check is then made to determine the SLA violation status of Medium priority data packets. At step 705, if the HI_CORRECTIVE_TIME is less than the MAX_HI_CORRECTIVE_TIME, then a check is made to determine whether the HI_SLA_VIOLATION_COUNTER is greater than MAX_HI_SLA_VIOLATIONS, as shown in step 709. If the HI_SLA_VIOLATION_COUNTER is less than MAX_HI_SLA_VIOLATIONS, flow control is applied at step 711. If the HI_SLA_VIOLATION_COUNTER is greater than MAX_HI_SLA_VIOLATIONS, then a check is made to determine whether the NO_OF_SESSIONS currently underway is greater than MAX_SESSIONS, as shown in step 713. In case the NO_OF_SESSIONS is greater, then the current session is Reset at step 715, else flow control algorithm is applied at step 711. New input data packets are then received at step 501.

After the check for HI_SLA_VIOLATION is completed or if no HI_SLA_VIOLATION has taken place, a check for MED_SLA_VIOLATION is made, as shown in step 717. If the MED_SLA_VIOLATION is set to 0, then a check is made for the SLA violations of the Low priority data packets. If the MED_SLA_VIOLATION flag is set to 1, then a MED_CORRECTIVE_TIME is calculated at step 719. A check is then made to determine whether the MED_CORRECTIVE_TIME is greater than the MAX_MED_CORRECTIVE_TIME, as shown in step 721. If the MED_CORRECTIVE_TIME is less than the MAX_MED_CORRECTIVE_TIME, then a check is made whether the MED_SLA_VIOLATION_COUNTER is greater than MAX_MED_SLA_VIOLATIONS, as shown in step 723. If the MED_SLA_VIOLATION_COUNTER is not greater than the MAX_MED_SLA_VIOLATIONS, then flow control is applied at step 725. However, if the MED_SLA_VIOLATION_COUNTER is greater, then a check is made to determine whether the NO_OF_SESSIONS currently underway is greater than MAX_NO_OF SESSIONS, as shown in step 727. If the NO_OF_SESSIONS is greater, then current session is Reset at step 729, else flow control is applied at step 725. New input data packets are then received at step 501. If the MED_CORRECTIVE_TIME is greater than MAX_MED_CORRECTIVE_TIME, as shown in step 721, then it is assumed that the SLA violation of Medium priority data packets already been corrected. Subsequently, the MED_SLA_VIOLATED flag and MED_SLA_VIOLATION_COUNTER are set to 0, as shown in step 731.

After the check for MED_SLA_VIOLATION is completed or if no MED_SLA_VIOLATION had taken place, a check for LOW_SLA_VIOLATION is made at step 733. If the LOW_SLA_VIOLATION is set as 0, then no flow control is needed. New input data packets are then received at step 501. But if LOW_SLA_VIOLATION flag is found to have value 1, then a LOW_CORRECTIVE_TIME is calculated at step 735. This value is found by deducting LAST_LOW_SLA_VIOLATION_TIME from the CURRENT_TIME stamp. A check is then made to determine whether the LOW_CORRECTIVE_TIME is greater than the MAX_LOW_CORRECTIVE_TIME, as shown in step 737. If the LOW_CORRECTIVE_TIME is less than the MAX_LOW_CORRECTIVE TIME, then a check is made whether the LOW_SLA_VIOLATION_COUNTER is greater than MAX_LOW_SLA_VIOLATIONS in step 739. If the LOW_SLA_VIOLATION_COUNTER is not greater than the MAX_LOW_SLA_VIOLATIONS, then flow control is applied, as shown in step 741. However, if the LOW_SLA_VIOLATION_COUNTER is greater, then a check is made to determine whether the NO_OF_SESSIONS currently underway is greater than MAX_NO_OF_SESSIONS, as shown in step 743. If the NO_OF_SESSIONS is greater, then current session is Reset at step 745 else flow control is applied at step 741. Once flow control has been applied or the session has been Reset, new input packets are received at step 501. At step 737, if the LOW_CORRECTIVE_TIME is greater than MAX_LOW_CORRECTIVE_TIME, then it is assumed that the SLA violation of Medium priority data packets has already been corrected. Subsequently, the LOW SLA_VIOLATED flag and LOW_SLA_VIOLATION_COUNTER are set to 0, as shown in step 747. New input packets are then received at step 501.

Figure 8:
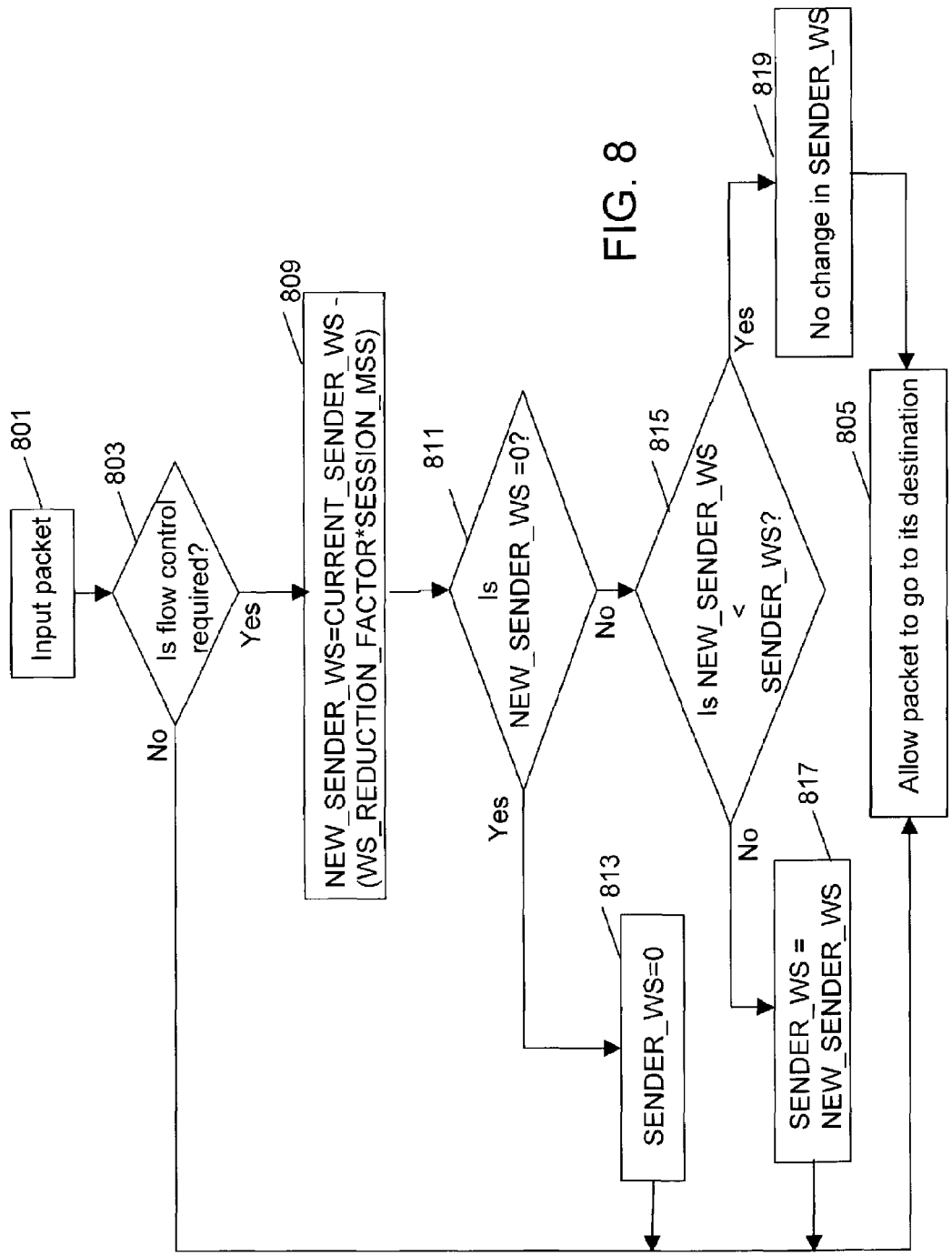
FIG. 8 illustrates a method of flow control by changing server side window size.

FIG. 8 illustrates a method of flow control by changing server side window size. At step 801, a new input data packet is received. At step 803, a check is made whether the flow control has to be applied on the input data packet. In case no flow control is needed, the data packet is allowed to go to its destination, as shown in step 805. However, if flow control is needed, then the window size at the server side is reduced, as shown in step 809. The window size is reduced by an integral multiple of Maximum Segment Size (MSS). A check is then made at step 811 to determine whether the computed window size is 0. If the reduced window size is computed to be 0, the server side window size is reset to 0, as shown in step 813 and the data packet is allowed to move to its destination. If the computed window size is not 0, then at step 815 a check is made whether the computed window size is smaller than the original server side window size. If the computed window size is smaller than the original server side window size, then the server side window size is made equal to the computed window size, as shown in step 817. However, if the computed window size is greater, then no change in the server side window size is made, as shown in step 819. After the new server side window size has been set, the data packet is allowed to go to its destination, as shown in step 805.

Figure 9:
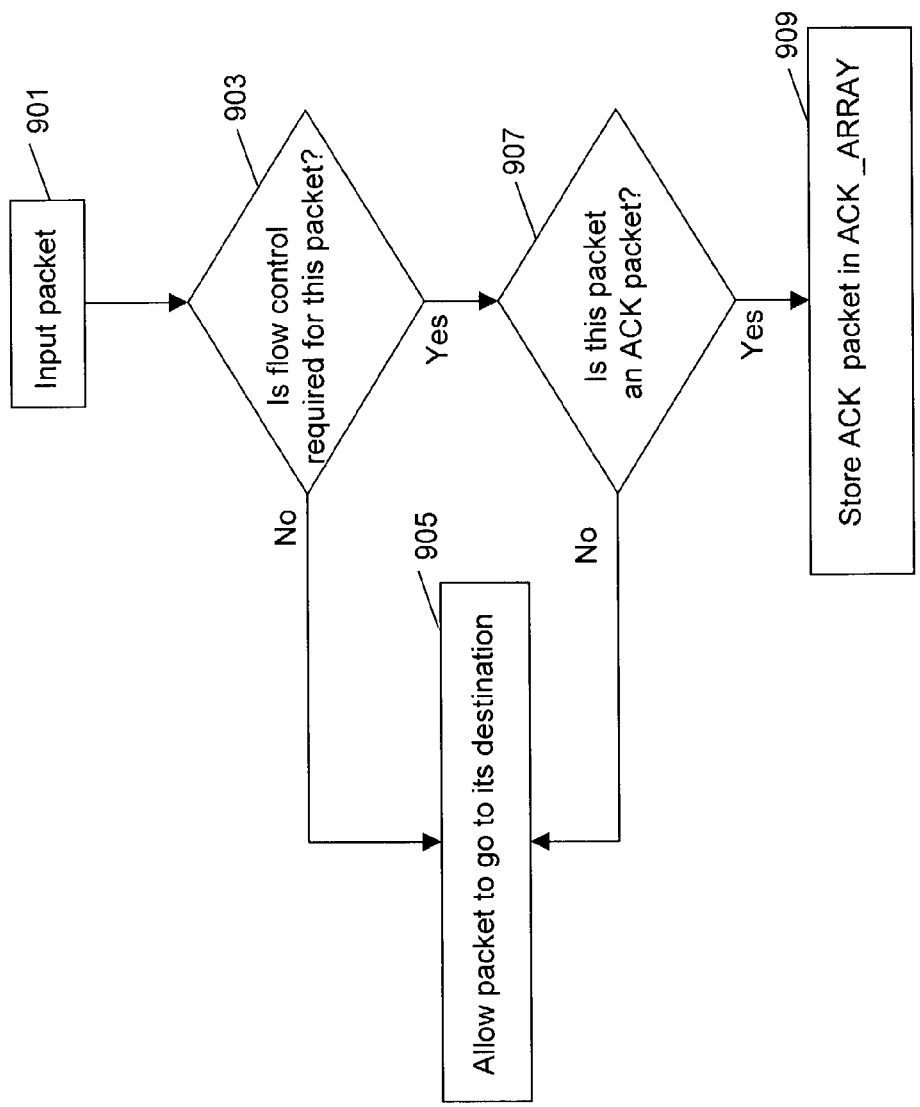
FIG. 9 illustrates a method of flow control by delaying client ACK packets.

FIG. 9 illustrates a method of flow control by delaying client ACK packets. At step 901, a new input data packet is received. At step 903, a check is made whether flow control is required for the input data packet. If flow control is not required for the data packet, then the data packet is allowed to go to its destination, as shown in step 905. If flow control is required, then a check is made to determine whether the input data packet is an ACK packet, as shown in step 907. If it is not an ACK packet, then the data packet is allowed to go to its destination, as shown in step 905. If it is a client ACK packet, then it is stored in an Array in the PA called the ACK_ARRAY, as shown in step 909. This induces delay in the flow of data packets from client to server since the server would not pass the next set of data packets till it has received the client ACK for the previous data packets it had sent. This causes flow control in the system.

Figure 10:
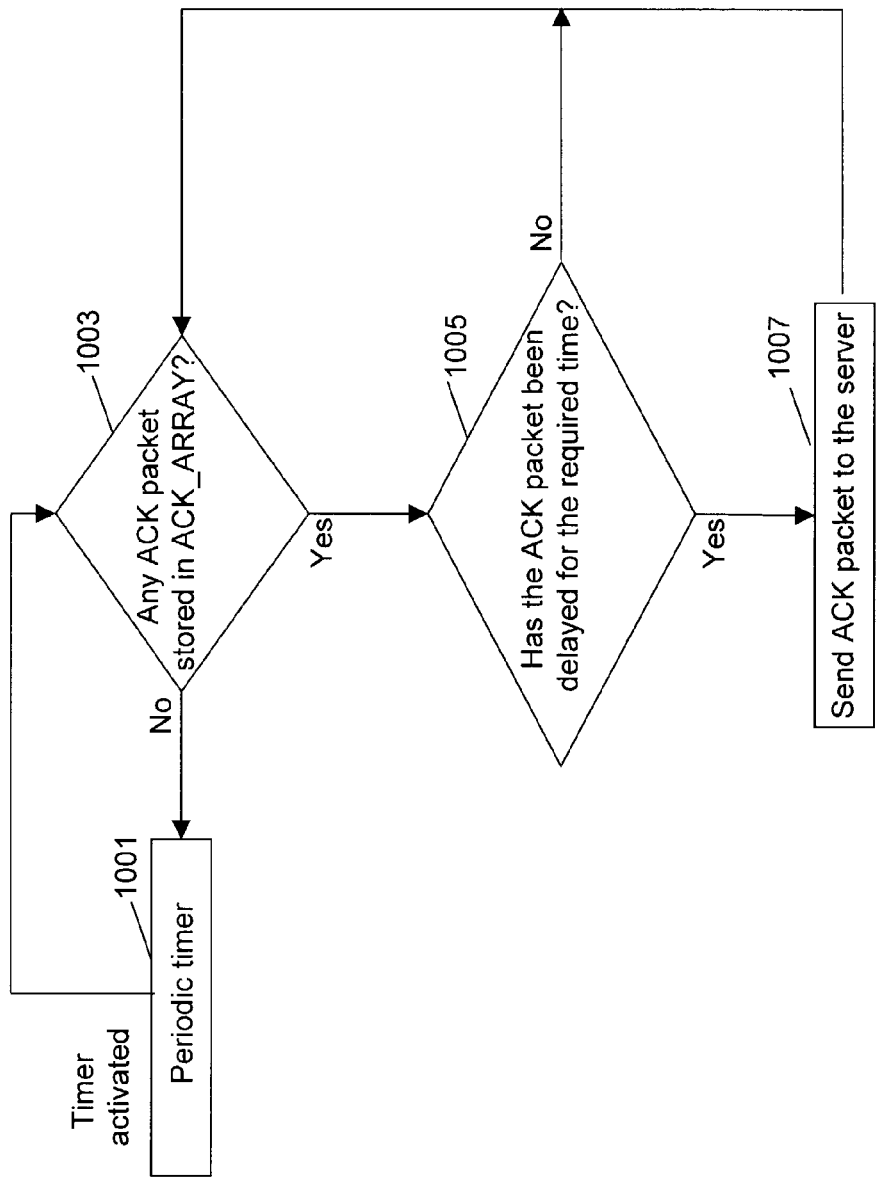
FIG. 10 illustrates a method followed to achieve delay of ACK packets for a definite period of time.

FIG. 10 illustrates a method followed to achieve delay of ACK packets for a definite period of time. At step 1001, a periodic timer is activated. This timer checks whether there is a pending ACK packet in the ACK_ARRAY of the PA, as shown in step 1003. If there is no ACK packet stored, then step 1001 is repeated. If there is a pending ACK packet, a check is made in step 1005 to see if that ACK packet has been withheld for a predefined period of time. If the ACK packet has been withheld for the predefined period of time, then the ACK packet is allowed to go to the server, as shown in step 1007. If the ACK packet has not been withheld for the predefined period of time, then a check is again made on the ACK_ARRAY, as shown in step 1003. In a preferred embodiment of the present invention, the holding time for an ACK packet in the array is determined keeping into consideration the TCP timers for retransmissions. If retransmission times are not considered, wastage of network resources could take place. The server can send a duplicate data packet to the client in case the holding time is kept greater than the retransmission time.

The system, as described in the present invention or any of its components may be embodied in the form of a processing machine. Typical examples of a processing machine include a general-purpose computer, a programmed microprocessor, a micro-controller, a peripheral integrated circuit element, and other devices or arrangements of devices that are capable of implementing the steps that constitute the method of the present invention.

The processing machine executes a set of instructions that are stored in one or more storage elements, in order to process input data. The storage elements may also hold data or other information as desired. The storage element may be in the form of a database or a physical memory element present in the processing machine.

The set of instructions may include various instructions that instruct the processing machine to perform specific tasks such as the steps that constitute the method of the present invention. The set of instructions may be in the form of a program or software. The software may be in various forms such as system software or application software. Further, the software might be in the form of a collection of separate programs, a program module with a larger program or a portion of a program module. The software might also include modular programming in the form of object-oriented programming. The processing of input data by the processing machine may be in response to user commands, or in response to results of previous processing or in response to a request made by another processing machine.

A person skilled in the art can appreciate that it is not necessary that the various processing machines and/or storage elements be physically located in the same geographical location. The processing machines and/or storage elements may be located in geographically distinct locations and connected to each other to enable communication. Various communication technologies may be used to enable communication between the processing machines and/or storage elements. Such technologies include session of the processing machines and/or storage elements, in the form of a network. The network can be an intranet, an extranet, the Internet or any client server models that enable communication. Such communication technologies may use various protocols such as TCP/IP, UDP, ATM or OSI.

While the preferred embodiments of the invention have been illustrated and described, it will be clear that the invention is not limited to these embodiments only. Numerous modifications, changes, variations, substitutions and equivalents will be apparent to those skilled in the art without departing from the spirit and scope of the invention as described in the claims.

What is claimed is:

1. A method of regulating flow of one or more data packets in a computer network, the computer network comprising at least one client and at least one server, each of the clients establishing one or more session(s) with the servers to access one or more applications from the servers, the servers providing access to the applications by exchanging the data packets with the clients, the servers being hosted by an application service provider, the application service provider offering one or more service level agreements to the clients, the service level agreements defining priorities for the data packets, the method comprising the steps of:
   a. determining whether a service level agreement violation has taken place;
   b. if the service level agreement violation has taken place and the time elapsed after the service level agreement violation has taken place is less than a predefined limit, then controlling the flow of the data packets of a predefined priority, wherein controlling the flow of the data packets comprises, at least one of:
      i. reducing the window size of the servers;
      ii. delaying acknowledgement packets for the data packets sent by the servers, the acknowledgement packets being sent by the clients; and
   c. resetting a current session when the number of service level agreement violations exceeds a first predefined limit and number of ongoing sessions exceeds a second predefined limit.

2. The method as recited in claim 1 wherein the step of determining whether the service level agreement violation has taken place comprises the steps of:
   i. computing a response time for the data packets sent by the servers; and
   ii. comparing the computed response time with the response time agreed upon in the service level agreement for the data packets.

3. The method as recited in claim 1, wherein the window size of the servers is reduced by an integral multiple of maximum segment size, the maximum segment size being the largest amount of data that a server can store.

4. The method as recited in claim 1, wherein the step of delaying the acknowledgement packets for the data packets sent by the servers comprises the steps of:
   I. determining whether an input data packet is an acknowledgement packet; and
   II. storing the input data packet in an array if it is an acknowledgement packet, whereby the receipt of the acknowledgement packet by the servers is delayed.

5. A system for regulating flow of one or more data packets in a computer network, the computer network comprising at least one client and at least one server, each of the clients establishing one or more session(s) with the servers to access one or more applications from the servers, the servers providing access to the applications by exchanging the data packets with the clients, the servers being hosted by an application service provider, the application service provider offering one or more service level agreements to the clients, the service level agreements defining priorities for the data packets, the system comprising:
   a. means for determining whether a service level agreement violation has taken place;
   b. means for controlling the flow of the data packets of a predefined priority if the service level agreement violation has taken place and the time elapsed after the service level agreement violation has taken place is less than a predefined limit, wherein the means for controlling the flow of the data packets comprises, at least one of:
      i. means for reducing the window size of the servers; and
      ii. means for delaying acknowledgement packets sent by the servers, the acknowledgement packets being sent by the clients; and
   c. means for resetting a current session when the number of service level agreement violations exceeds a first predefined limit and number of ongoing sessions exceeds a second predefined limit.

6. The system as recited in claim 5 wherein the means for determining whether a service level agreement violation has taken place comprises:
   i. means for computing a response time for the data packets sent by the servers; and
   ii. means for comparing the computed response time with the response time agreed upon in the service level agreement for the data packets.

7. A computer program product for regulating flow on one or more data packets in a computer network, the computer network comprising at least one client and at least one server, each of the clients establishing one or more session(s) with the servers to access one or more applications from the servers, the servers providing access to the applications by exchanging the data packets with the clients, the servers being hosted by an application service provider, the application service provider offering one or more service level agreements to the clients, the service level agreement defining priorities for the data packets, the computer program product comprising:

program instruction means written on a computer readable medium comprising:

a. program instruction means for determining the priorities of the data packets;

b. program instruction means for determining whether a service level agreement violation has taken place, wherein the program instruction means for determination of the service level agreement violation comprises:

i. program instruction means for computing a response time for the data packets sent by the servers; and ii. program instruction means for comparing the computed response time with the response time agreed upon in the service level agreement for the data packets; and c. program instruction means for controlling the flow of the data packets of a predefined priority if the service level agreement violation has taken place and the time elapsed after the service level agreement violation has taken place is less than a predefined limit, wherein the program instruction means for controlling the flow of the data packets comprises, at least one of:

i. program instruction means for reducing the window size of the servers; and ii. program instruction means for delaying acknowledgement packets sent by the servers, the acknowledgement packets being sent by the clients; and d. program instruction means for resetting a current session when the number of service level agreement violations exceeds a first predefined limit and number of ongoing sessions exceeds a second predefined limit.

8. A method of regulating flow of on one or more data packets in a computer network, the computer network comprising at least one client and at least one server, each of the clients establishing one or more session(s) with the servers to access one or more applications from the servers, the servers providing access to the applications by exchanging the data packets with the clients, the servers being hosted by an application service provider, the application service provider offering one or more service level agreements to the clients, the method comprising the steps of:

a. prioritizing the data packets, the prioritization being done on the basis of the service level agreements;

b. determining whether a service level agreement violation has taken place;

c. if the service level agreement violation has taken place and time elapsed after the service level agreement violation has taken place is less than a predefined limit, then controlling the flow of the data packets of a predefined priority; and d. resetting a current session when the number of service level agreement violations exceed a first predefined limit and the number of ongoing sessions exceed a second predefined limit.

9. The method as recited in claim 8 wherein the step of determining the service level agreement violation comprises the steps of:

i. computing a response time for the data packets sent by the servers; and ii. comparing the computed response time with the response time agreed upon in the service level agreement for the data packets.

10. The method as recited in claim 9 wherein the step of controlling the flow of the data packets of the predefined priority comprises the step of reducing the window size of the servers.

11. The method as recited in claim 9 wherein the step of controlling the flow of the data packets of the predefined priority comprises the step of delaying acknowledgement packets for the data packets sent by the servers, the acknowledgement packets being sent by the clients.

12. A method of regulating flow of one or more data packets in a computer network, the computer network comprising at least one client and at least one server, each of the clients establishing one or more session(s) with the servers to access one or more applications from the servers, the servers providing access to the applications by exchanging the data packets with the clients, the servers being hosted by an application service provider, the application service provider offering one or more service level agreements to the clients, the method comprising the steps of:

a. prioritizing the data packets, the prioritization being done on the basis of the service level agreements;

b. determining whether a service level agreement violation has taken place wherein the determination of the service level agreement violation comprises:

i. computing a response time for the data packets sent by the servers; and ii. comparing the computed response time with the response time agreed upon in the service level agreement for the data packets;

c. if the service level agreement violation has taken place and the time elapsed after the service level agreement violation has taken place is less than a predefined limit, then controlling the flow of the data packets of a predefined priority wherein controlling the flow of the data packets comprises, at least one of:

i. reducing the window size of the servers; and ii. delaying acknowledgement packets for the data packets sent by the servers, the acknowledgement packets being sent by the clients; and d. resetting a current session when the number of service level agreement violations exceeds a first predefined limit and the number of ongoing sessions exceeds a second predefined limit.

* * * * *